UNITED STATES PATENT OFFICE.

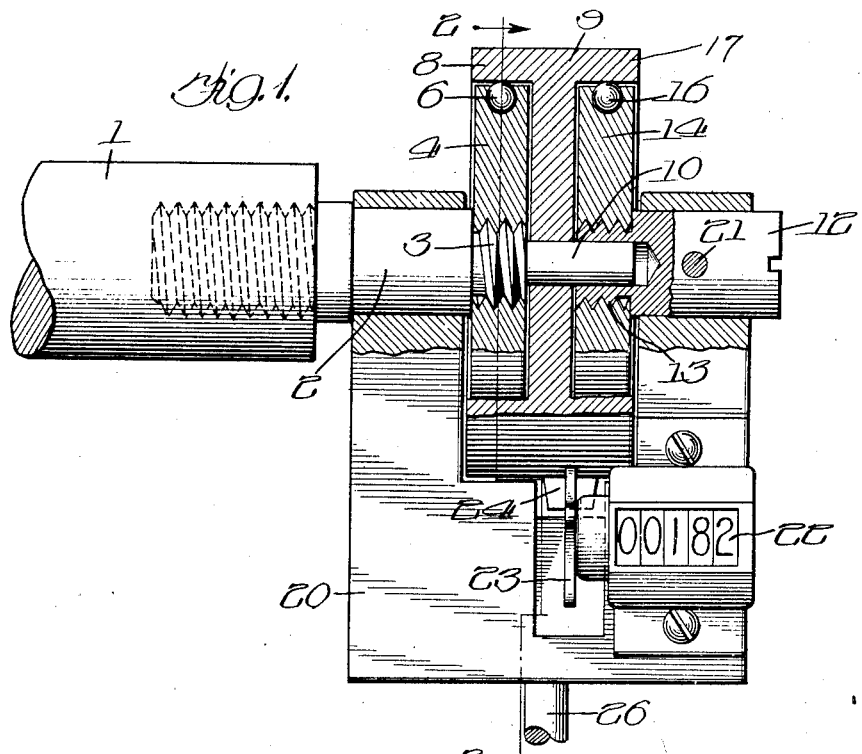
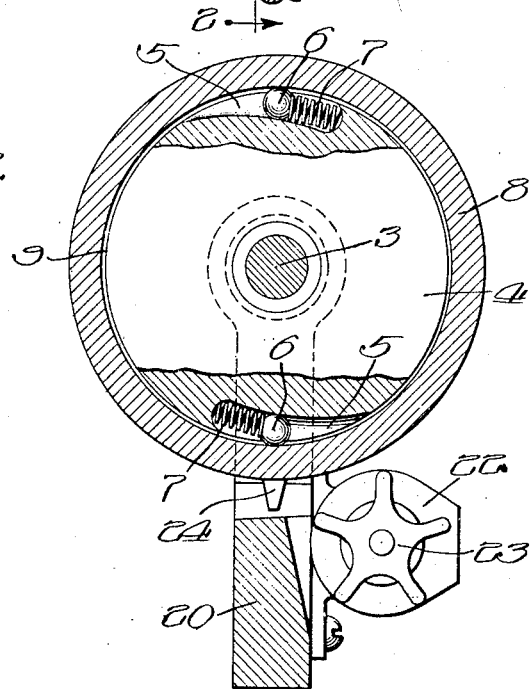

FREDERICK K. BOOMHOWER AND WILLIAM A. EBERMAN, OF CHICAGO, ILLINOIS.

REGISTER.

1,026,070.　　　　Specification of Letters Patent.　　Patented May 14, 1912.

Application filed December 11, 1911. Serial No. 665,079.

*To all whom it may concern:*

Be it known that we, FREDERICK K. BOOMHOWER and WILLIAM A. EBERMAN, citizens of the United States, residing at Chicago, in the county of Cook and State of Illinois, have invented a certain new and useful Improvement in Registers, of which the following is a specification.

Our invention relates to apparatus for registering the travel of elevators, and one of the objects of the invention is to provide simple and efficient means for accurately registering the movement of the car in one direction only.

Another object of the invention is to provide mechanism of such construction that it may be attached directly to the head shaft of the elevator and carried thereby without other support or assistance.

We obtain our objects by the mechanism illustrated in the accompanying drawings, in which—

Figure 1 is an elevation of the complete device partially in axial section. Fig. 2 is a sectional elevation taken on the line 2—2, Fig. 1.

Similar numerals refer to similar parts in the two views.

The shaft 1 represents the head shaft of an elevator or a shaft rotating backward and forward in correspondence therewith. We employ the term "head shaft" in the usual sense, meaning the shaft at the top of the elevator shaft or runway carrying the sheave over which the elevator cables run. This is the most advantageous location for our register, for this shaft can ordinarily be utilized by our mechanism without the assistance of any other brace or support, but the mechanism may be applied to any shaft or element rotating backward and forward in correspondence with the movement of the elevator car.

According to the preferred construction shown in the drawings, a stud or arbor 2 is screwed into the end of shaft 1 and is thus rigidly secured thereto. Said stud is provided with a threaded portion 3 of reduced diameter, upon which screws a disk 4. The construction is such that said disk rotates always in unison with shaft 1 and stud 2. Taper pockets 5 are formed in the periphery of disk 4, these pockets receiving balls or wedges 6 packed up by springs 7, thus forming a ball or wedge clutch device in connection with the encircling flange 8 of the disk 9. Disk 9 bears loosely upon the cylindrical portion 10 formed upon the stud 2 beyond the threaded portion 3. The arrangement of the parts is such that the clutch device will rotate disk 9 in one direction but have no influence to positively drive it in the opposite direction.

A cylindrical cap 12 is axially chambered at one end to receive and bear loosely upon the projecting end of the cylindrical portion 10 of stud 2. Said cap is provided with a threaded portion 13 onto which screws a disk 14. Disk 14 is, therefore, rigid with cap 12 and is concentric therewith and with shaft 1 and stud 2. It is clear that as a result of this construction said shaft and stud may rotate without rotating said cap or the disk 14.

In the periphery of disk 14 pockets are formed to receive balls 16 backed up by springs (not shown), the construction being similar to that in disk 4 (see Fig. 2) except that the parts are so arranged that the non-rotating disk 14 will prevent backward rotation of the central disk 9. The balls in disk 14 coöperate with a flange 17 formed on the central disk and extending in the opposite direction from the flange 8 previously mentioned. In our construction the disks 4 and 14 are housed within the central disk and are thereby protected from damage from exterior objects and are to a great extent protected from dust and grit.

A frame 20 is suspended from the stud 2 and from the cap 12 supported from said stud. Said frame is rigidly secured by means of a pin 21 or otherwise to the cap 12 but loosely bears upon the stud 2 near the supported end thereof. Thus the frame is free to swing about the center of the shaft and stud as an axis. This frame is approximately U shaped in form when viewed from the front as in Fig. 1, being recessed in the center to receive the disks 4, 9 and 14. A counter 22 is rigidly fastened to the frame and is actuated by a star wheel 23 located in position to be engaged by a tooth 24 formed on the periphery of the central disk 9.

In accordance with a common practice in counters, the star wheel, if rotated at all, rotates a full step, thereby insuring that the teeth of the star wheel will be properly presented to the tooth 24 each time as the latter approaches. Means are provided for preventing the frame itself from rotating with the shaft. This may be accomplished in various ways, for example, by means of a weight 27 suspended on a rod 26 extending down from the frame.

In operation, when the shaft 1 rotates in a forward direction, it drives the disk 4, and this in turn drives the central or counter disk 9, thereby causing the tooth 24 on said disk to advance the counter one step each time said disk completes a revolution. As soon as the shaft rotates in the return direction, however, the nonrotating disk 14 engages the counter disk 9 and holds it fast. Said counter disk is thereby permitted to move in the forward direction only.

Our construction, in which the supporting frame 20 is suspended and is permitted to vibrate back and forth to a limited extent instead of being held rigid, has at least two advantages. In the first place, it needs no support in addition to the head shaft itself, and, second, as the frame is free to swing, it absorbs any shock or jar which might do damage if the frame were rigidly held. With respect to the first advantage, it will be understood that the head shaft of an elevator is usually located at such position near the roof of the building that additional braces or supporting frames would frequently be impractical and almost always be a nuisance and an added expense. As a result of our construction, no fixtures are required, it being necessary merely to tap the end of the head shaft and screw the arbor of my device thereinto.

It will be understood that the ball clutch is very accurate in its operation and capable of recording very small movements. When our device is used the entire movement of the car is registered down to a fraction of an inch, such as leveling a car floor at the landing after having stopped either too high or too low.

Having thus described our invention what we claim as new and desire to secure by Letters Patent, is:

In a register for elevators, a nonrotating disk, a rotating disk of equal size therewith rotating backward and forward, in correspondence with the movement of the elevator, a central rotatable disk located between them, a register actuated by said central disk, and a ball clutch connection between said central disk and each of the others so arranged that the central disk is driven forward by the rotating disk and prevented from rotating backward by the nonrotating disk, said central disk having peripheral flanges which extend over and house both of the other disks and form parts of said ball clutch connections.

In witness whereof, we have hereunto subscribed our names in the presence of two witnesses.

FREDERICK K. BOOMHOWER.
WILLIAM A. EBERMAN.

Witnesses:
HOWARD M. COX,
MARGARET D. ROBB.